US007613927B2

(12) United States Patent
Holovacs

(10) Patent No.: US 7,613,927 B2
(45) Date of Patent: Nov. 3, 2009

(54) SYSTEM FOR PROVIDING SECURE ACCESS TO KVM SWITCH AND OTHER SERVER MANAGEMENT SYSTEMS

(75) Inventor: Jayson Holovacs, Dunellen, NJ (US)

(73) Assignee: Raritan Americas, Inc., Somerset, NJ (US)

( * ) Notice: Subject to any disclaimer, the term of this patent is extended or adjusted under 35 U.S.C. 154(b) by 0 days.

(21) Appl. No.: 10/988,185

(22) Filed: Nov. 12, 2004

(65) Prior Publication Data

US 2006/0107061 A1    May 18, 2006

(51) Int. Cl.
 G06F 21/00   (2006.01)
 G06F 7/04    (2006.01)
(52) U.S. Cl. .............................. 713/182; 726/16; 726/27
(58) Field of Classification Search .................. 713/182; 726/16, 26
See application file for complete search history.

(56) References Cited

U.S. PATENT DOCUMENTS

| | | | | |
|---|---|---|---|---|
| 5,629,981 A * | 5/1997 | Nerlikar ...................... 713/168 |
| 5,732,212 A | 3/1998 | Perholtz et al. |
| 5,884,096 A | 3/1999 | Beasley et al. |
| 5,901,246 A * | 5/1999 | Hoffberg et al. ............. 382/209 |
| 5,959,530 A | 9/1999 | Lupien, Jr. et al. |
| 6,112,264 A | 8/2000 | Beasley et al. |
| 6,256,014 B1 * | 7/2001 | Thomas et al. .............. 345/163 |
| 6,304,895 B1 | 10/2001 | Schneider et al. |
| 6,378,009 B1 * | 4/2002 | Pinkston et al. ............... 710/62 |
| 6,464,136 B2 | 10/2002 | Walsh |
| 6,510,517 B1 * | 1/2003 | Bruhnke et al. ............. 713/168 |
| 6,539,418 B2 * | 3/2003 | Schneider et al. ........... 709/203 |
| 6,557,170 B1 * | 4/2003 | Wilder et al. ................ 725/130 |
| 6,618,774 B1 | 9/2003 | Dickens et al. |
| 6,633,905 B1 | 10/2003 | Anderson et al. |
| 6,637,649 B2 | 10/2003 | Walsh |
| 6,671,358 B1 * | 12/2003 | Seidman et al. .......... 379/93.12 |
| 6,671,756 B1 | 12/2003 | Thomas et al. |
| 6,681,250 B1 * | 1/2004 | Thomas et al. .............. 709/226 |
| 6,701,380 B2 | 3/2004 | Schneider et al. |
| 6,825,751 B1 * | 11/2004 | Kita et al. ................... 340/5.61 |
| 6,836,843 B2 * | 12/2004 | Seroussi et al. ............. 713/173 |
| 6,842,106 B2 * | 1/2005 | Hughes et al. ................ 340/5.8 |
| 6,915,362 B2 * | 7/2005 | Ramsey et al. ................ 710/62 |
| 7,053,771 B2 * | 5/2006 | Hussmann ............. 340/539.11 |
| 7,107,455 B1 * | 9/2006 | Merkin ....................... 713/182 |
| 7,117,374 B2 * | 10/2006 | Hill et al. .................... 713/193 |
| 7,249,167 B1 * | 7/2007 | Liaw et al. .................. 709/218 |

(Continued)

OTHER PUBLICATIONS

McCullagh, D. "RFID tags: Big Brother in Small Packages" CNET News.com, Jan. 13, 2003.

(Continued)

Primary Examiner—Emmanuel L Moise
Assistant Examiner—Techane J Gergiso

(57) ABSTRACT

A secure switching system that utilizes radio frequency identification (RFID) technology to allow only authorized users to access a remote management or keyboard, video, mouse (KVM) switching system. The system includes a plurality of user workstations that allow a user to select, monitor, and operate remote devices using a local keyboard, video monitor, and cursor control device. Coupled to or integrated with the system is an RFID transceiver that detects the presence of RFID tags that are within range of communications. A user workstation is only operable if the RFID transceiver detects a valid RFID tag.

27 Claims, 10 Drawing Sheets

U.S. PATENT DOCUMENTS

| | | | |
|---|---|---|---|
| 7,284,278 B2 * | 10/2007 | Anson et al. ................... 726/34 |
| 2002/0053975 A1 * | 5/2002 | Fitzgibbon et al. .......... 340/541 |
| 2002/0095222 A1 * | 7/2002 | Lignoul ........................ 700/13 |
| 2002/0128977 A1 * | 9/2002 | Nambiar et al. ............... 705/64 |
| 2002/0171546 A1 * | 11/2002 | Evans et al. ................. 340/540 |
| 2002/0174336 A1 * | 11/2002 | Sakakibara et al. .......... 713/172 |
| 2003/0005193 A1 * | 1/2003 | Seroussi et al. ............. 710/107 |
| 2003/0034390 A1 * | 2/2003 | Linton et al. ................ 235/382 |
| 2003/0035049 A1 * | 2/2003 | Dickens et al. .............. 348/100 |
| 2003/0051021 A1 * | 3/2003 | Hirschfeld et al. ........... 709/223 |
| 2003/0135654 A1 * | 7/2003 | Chang ........................ 709/250 |
| 2003/0172090 A1 * | 9/2003 | Asunmaa et al. ............ 707/200 |
| 2003/0174049 A1 * | 9/2003 | Beigel et al. ............. 340/10.42 |
| 2003/0187787 A1 * | 10/2003 | Freund ........................ 705/39 |
| 2003/0220876 A1 * | 11/2003 | Burger et al. ................. 705/50 |
| 2004/0002305 A1 * | 1/2004 | Byman-Kivivuori et al. ......................... 455/41.2 |
| 2004/0010449 A1 * | 1/2004 | Berardi et al. ................. 705/16 |
| 2004/0066273 A1 * | 4/2004 | Cortina et al. ................ 340/5.1 |
| 2004/0141616 A1 * | 7/2004 | Himmel et al. ............. 380/270 |
| 2004/0176032 A1 * | 9/2004 | Kotola et al. ............. 455/41.2 |
| 2004/0177264 A1 * | 9/2004 | Anson et al. ................. 713/200 |
| 2004/0203944 A1 * | 10/2004 | Huomo et al. .............. 455/466 |
| 2004/0232220 A1 * | 11/2004 | Beenau et al. .............. 235/380 |
| 2004/0244031 A1 * | 12/2004 | Martinez ..................... 725/25 |
| 2004/0252012 A1 * | 12/2004 | Beenau et al. ................ 340/5.4 |
| 2005/0039027 A1 * | 2/2005 | Shapiro ...................... 713/186 |
| 2005/0149738 A1 * | 7/2005 | Targosky .................... 713/182 |
| 2005/0156022 A1 * | 7/2005 | Hepworth et al. ........... 235/375 |
| 2005/0207624 A1 * | 9/2005 | Ehlers et al. ................ 382/124 |
| 2005/0215233 A1 * | 9/2005 | Perera et al. ................ 455/411 |
| 2005/0237194 A1 * | 10/2005 | VoBa ...................... 340/572.1 |
| 2005/0242925 A1 * | 11/2005 | Zaretsky et al. ............. 340/10.1 |
| 2005/0253683 A1 * | 11/2005 | Lowe ....................... 340/5.53 |
| 2005/0253717 A1 * | 11/2005 | Howarth et al. .......... 340/572.1 |
| 2006/0202964 A1 * | 9/2006 | Liaw et al. .................. 345/168 |

OTHER PUBLICATIONS

News Release "MATRICS introduces First-in-the-industry handheld RFID Reader for EPC-Compliant UHF Tags" Feb. 25, 2003.

Roberti, M, "Navigating the RFID Patent Landscape" RFID Journal, Oct. 13, 2004.

"Matrics EPC Radio Frequency Identification: Matrics RFID Tags" Date Unknown.

"Matrics Readers—They're not Just Reasders Anymore" Date Unknown.

International Search Report and Written Opinion by the International Searching Authority, issued on Aug. 14, 2006, in the PCT application No. PCT/US05/40528.

* cited by examiner

SYSTEM FOR PROVIDING SECURE ACCESS TO KVM SWITCH AND OTHER SERVER MANAGEMENT SYSTEMS

FIELD OF THE INVENTION

The present invention relates generally to a secure remote device management system for coupling a series of remote computers to one or more user workstations whereby access to the system is limited to authorized users as determined by a radio frequency identification ("RFID") system. In particular, each user workstation is coupled to an RFID transceiver that detects responses from RFID tags. Access to the system via a user workstation is only permitted if a valid RFID tag is within range of the corresponding RFID transceiver.

BACKGROUND OF THE INVENTION

The present invention improves the security of KVM switching systems and remote device management systems by using RFID technology to prevent unauthorized remote access to computers, servers, network, equipment, etc.

As is known in the art, a KVM switching system may be utilized to allow one or more user workstations to select and control any one of a plurality of remote computers via one or more switching units. Such systems are well known in the art and have been used by system administrators for over 10 years. Specifically, a KVM switching system allows a system user to control a remote computer using a local user workstation's keyboard, video monitor, and mouse as if these devices are directly connected to the remote computer. In this manner, a user may access and control a plurality of remote computers, such as servers, from a single location (i.e., the location of the user workstation).

The system user may select a specific remote computer to access or control using any one of a variety of methods known in the art including: pushing a button on the face of a switching system component that corresponds with the desired remote computer, selecting the computer from a list displayed on a switching system component's LCD or LED display, pressing one or more hot keys on the local user workstation's keyboard (e.g., F1, ALT-F1, F2, etc.), or selecting the remote computer from a list displayed on the user workstation's monitor by pointing to it or scrolling to it using the user workstation's keyboard and/or mouse, etc. This list is exemplary only and not intended to limit the scope of the claims, as many other methods are known in the art.

Many of the earlier developed KVM switching systems required that the user workstation be within a certain distance of the remote device. For example, many of these systems transmit signals over extended-length CAT5 cables where severe signal degradation tends to occur when the length of the cable exceeds fifteen hundred (1500) feet. However, due to the increasing complexity of an organization's networks, it is often desirable to manage networking equipment, servers, and computers that are remotely located from the system administrator. For example, in distributed systems, remote devices may be dispersed across a city, a country, or even the world. In these configurations, basic KVM switching systems are inadequate. Thus, remote device management systems are often used in lieu of, or in conjunction with, KVM switching systems.

Remote device management systems utilize existing networks (e.g., the Internet, a local area network ("LAN"), a wide area network ("WAN"), a wireless network, a modem connection, etc.) to enable a user to operate a remote computer from a user workstation. For example, a remote management solution may comprise a KVM switch which is accessible over the Internet or LAN via a common protocol, such as TCP/IP. Such solutions may also offer modem or wireless access.

To access remote management systems, generally, a user or system administrator uses an Internet web-browser or proprietary software stored on a standard or specialized computer. Once a remote computer has been selected by the user for control, the video signals of the remote computer are transmitted to the user workstation's video monitor. Simultaneously, keyboard and/or mouse signals are sent from the user station to the remote computer through the network. The system may additionally include a connection to the power source of the remote computer for a hard reboot in case of system failure.

Whereas KVM switching systems transmit analog video signals, remote device management systems must digitize video signals before transmitting the signals over a TCP/IP network. Further, because of bandwidth constraints, remote device management systems generally utilize compression algorithms to reduce the necessary bandwidth required to transmit the digital video signals. For example, a remote network management system may use the compression algorithm disclosed in U.S. patent application Ser. No. 10/233, 299, which is incorporated herein by reference, to reduce and compress the digital data that must be transmitted to the remote computers and/or video display devices.

Whenever a KVM or remote management system is employed, security is a great concern. By enabling remote access to computers and devices that may otherwise be secure, a KVM or remote device management system may leave such devices vulnerable to unauthorized use. Remote management systems that enable TCP/IP or Internet access are especially prone to security problems because there is no distance limitation between the user workstation and the remote devices connected to the system.

In light of the remote access to potentially sensitive information offered by KVM and remote management systems, many such systems require that a user enter identification information (e.g., a user name and password) in order to gain access to the system. Biometric identification has also been proposed as a method of preventing unauthorized access. These methods provide some security, but are still prone to security failures. For example, it is often easy to obtain or guess a user name and password. Further, biometric identification is prone to tampering and is often inconvenient to the user. Finally, in all such systems, user-error can leave the system open to unauthorized use. For example, if a user forgets to log-out of the system, an unauthorized user can easily gain access. Unauthorized access to a KVM or remote device management system may be especially problematic because it gives a user direct access to the devices, servers and computers. Often companies provide this access to all computers in a network so that system administrators can re-boot or reconfigure the devices, or copy and move sensitive information between computers. Clearly, with such access it is imperative to provide maximum security.

Therefore, a clear need exists for KVM and remote management systems that provide a more secure method of preventing unauthorized access. One solution is to incorporate RFID or similar technology into KVM systems. This solution results in allowing authorized users to access the system.

RFID is a technology that incorporates the use of electromagnetic or electrostatic coupling in the radio frequency ("RF") portion of the electromagnetic spectrum to uniquely identify an object, animal, or person. Typical systems that utilize RFID technology consist of three (3) components: (1)

an antenna or coil; (2) a transceiver (with decoder); and (3) a transponder ("RFID tag") electronically programmed with unique information (e.g., a unique identification number). Generally, the antenna is coupled to the transceiver (collectively referred to herein as an "RFID transceiver") to communicate with any number of RFID tags. The RFID tag can be a small wearable tag or pin, or may be embedded within a user ID badge or equivalent.

Normally, during operation, the antenna (coupled to the transceiver), emits radio signals to activate the tag and read or write data to it. Depending on the power output and the frequency used by the antenna, the range of communications may be anywhere from one inch to one hundred (100) feet or more. When the RFID tag receives the emitted radio signals, it transmits data in response. This data is received and decoded by the RFID transceiver. The RFID transceiver may then pass the data to the device that the user wishes to access for processing, storage, etc.

Additionally, RFID tags may be active or passive. Active tags are powered by an internal battery and are typically read/write devices. Passive tags do not need a power source, and instead, obtain operating power generated from the RFID transceiver. Thus, advantageously, passive tags may be smaller and lighter in weight than active tags.

A significant advantage of RFID systems is the non-contact, non-line-of-sight nature of the technology. A user can wear an RFID tag on their person and the transceiver will automatically sense the tag when it is in range. Another intrinsic advantage of RFID systems is that each RFID tag contains a "globally unique" identification number. Thus, the same RFID tag can be used across multiple systems. In short, an RFID tag can be used as a universal form of identification. Currently, systems are known in the art that utilize RFID for diverse applications ranging from tracking animal migration patterns to preventing theft of merchandise.

In view of the foregoing, a need clearly exists for a secure remote device management system with advanced security features, such as RFID technology, to restrict access to the system. The system should restrict access to computers, servers, devices, and other equipment accessible via remote network management systems to authorized users. Such a system should be capable of integrating RFID security with other methods such as those requiring a user identification number, password, or biometric identification. The system should aid in managing remote computing environments, without compromising the security of such environments thereby reducing the need to have an on-site system administrator.

SUMMARY OF THE INVENTION

The present invention relates generally to a secure remote device management system for coupling a series of remote devices to one or more user workstations whereby access to the system is limited to authorized users as determined by, preferably, a RFID system. In particular, each user workstation is coupled to an RFID transceiver that detects responses from valid RFID tags. Access to the system via a user workstation is only permitted if a valid RFID tag is within range of the corresponding RFID transceiver. The RFID system of the present invention can be used to provide security in any KVM system, remote device management system, or equivalent system that necessitates secure access and control.

In many circumstances, it is desirable to utilize a user workstation, which includes peripheral devices such as a keyboard, a video monitor, and a cursor control device, to remotely access computers, servers, networking equipment, etc. Remote management systems and KVM switches are known that provide remote access to servers, computers, networking equipment, etc., from any Internet-enabled device at any location. However, allowing this remote access may leave the remote computers prone to security breaches such as unauthorized access, tampering, stealing of confidential information, hacking, etc. Therefore, many businesses and other institutions have been hesitant to include the most sensitive computing equipment in KVM and remote management systems.

Some KVM and remote management systems require a user to enter a user name, or number, and password to gain access to the system (and the remote devices connected to the system).

The present invention provides a simple and effective means for improving the security of KVM switches and remote management systems by limiting access to the system (and associated remote devices) to authorized use. Preferably, the present invention uses RFID technology to verify the presence of an authorized user at a particular user workstation. Without the presence of an authorized user, the user workstation remains locked, inaccessible, or logged-out. This RFID technology can be combined with known security methods (username, password, biometric, etc.), to provide a more secure remote management system. One skilled in the art will acknowledge that the RFID system of the present invention can be incorporated into a variety of other computing systems requiring secure access to the system.

Standard RFID systems comprise three components: (1) an antenna; (2) a transceiver and (3) a transponder. In the system of the present invention, the antenna and transceiver are preferably implemented as one device (an RFID transceiver), which is in communication with the user stations. The transponder (RFID tag) is preferably implemented as a small, lightweight and inexpensive device. For example, the RFID tag can be built into employee ID badges, or it can be disposed within a passcard, a small pin attached to clothing, a bracelet worn on a wrist, etc.

During operation, the RFID technology is used to verify a user's access to the KVM switches, remote server management, computers, servers, and other devices that comprise the system of the present invention. The RFID system of the present invention is compatible with any system that necessitates secure access and control. Specifically, the system is preferably configured so that an RFID transceiver is in communication with each user workstation. To utilize a user workstation, the RFID transceiver requires that a valid RFID tag be within range (otherwise the user workstation is locked, logged-out, or otherwise inaccessible). The RFID transceiver functions to detect the presence of an RFID tag by intermittently transmitting radio signals to activate the tag. If an RFID tag is within range, the user workstation can be accessed. The RFID transceiver transmits radio signals that activate tags within a predefined range (i.e., activation signals). The RFID tag, which is preferably a passive tag, responds to activation signals with radio waves that include the RFID tag identification information. If the tag is not present, the user workstation is locked—i.e., inaccessible. A feature of RFID technology is that each tag has a unique identification number. The RFID transceiver receives the radio waves and decodes this identification number. The system then uses this identification number to verify the user.

As described, an RFID transceiver is preferably in communication with the user workstation so that the RFID transceiver can provide RFID tag information to the user workstation for verification. Alternatively, the verification may be completed by a remote access server ("RAS"). The system of the present invention may also store a "log" of all system activity, which again may be stored on a remote database. Using a RAS may be preferred because it can be in a secure location and can communicate with user workstations over a standard or secure network.

There are many advantages to implementing the RFID security system of the present invention. First, the system can be used for both a login and a logout. Specifically, the user workstation can be configured to remain active only while the RFID tag is within range of the RFID transceiver. In one implementation, the RFID transceiver periodically sends activation signals which trigger the RFID tag to send a response (if it is within range). If no response is received by the RFID transceiver, the system automatically logs-out. Thus, such an implementation obviates the problem of existing systems where, if a user forgets to log-out, the system is prone to unauthorized use.

The present invention is also unobtrusive and user-friendly. RFID technology does not require line-of-sight communication. Therefore, the systems of the present invention can automatically authenticate a user as the user approaches the terminal. Further, as described above, the RFID tag of the present invention is preferably a small, lightweight device that can be embedded in, for example, a user's ID badge. Finally, each RFID tag is preferably not only unique, but globally unique. Therefore, the same RFID tag can also be used by other systems. Thus, the RFID tag could form the basis for a universal "single log-on" capability.

The RFID security method of the present invention is compatible with all types of KVM switches and remote management systems. The system of the present invention may be implemented as a security add-on to existing KVM and remote management systems where RFID transceivers interface with each user workstation. In other embodiments, the RFID transceiver is an integral part of the user station.

The RFID system of the present invention may be used with any KVM or remote management system including those that provide compatibility between various operating systems and/or communication protocols. The present invention allows the same set of local peripheral devices (with RFID transceivers) to securely access and control remote computers executing a variety of operating systems and protocols, including but not limited to, those manufactured by Microsoft Corporation (Windows), Apple Computer, Inc. (Macintosh), Sun Microsystems, Inc. (Unix), Digital Equipment Corporation, Compaq Computer Corporation (Alpha), International Business Machines (RS/6000), Hewlett-Packard Company (HP9000) and SGI (IRIX).

Additionally, local devices may communicate with remote computers via a variety of protocols including, but not limited to Universal Serial Bus ("USB"), American Standard Code for Information Interchange ("ASCII"), and Recommend Standard-232 ("RS-232").

As described above, a variety of mechanisms may be used to connect the local user workstations and the remote computers. In one embodiment, the system is implemented as part of a KVM switching system. In this embodiment, the present invention preferably incorporates a single Category 5 Universal Twisted Pair ("CAT5") cable to connect each local user station (each having the necessary peripheral devices) and each remote computer interface module (each being connected to a remote computer) to the central switch of the system. However, other cabling may be used without departing from the spirit of the present invention.

In another embodiment, the present invention is implemented as part of a remote management system whereby users can access the system through standard networks such as LANs, WANs, the Internet, wireless networks, etc. In this embodiment, the user workstation may be a standard personal computer, whereby the user accesses the remote device management system via software embedded in a web-browser (e.g., an Applet). In this configuration, the RFID transceiver preferably communicates with the personal computer via a standard interface such as USB, serial, PS/2, etc. A valid RFID tag may then be verified by the remote device management system. Specifically, after receipt of the RFID tag identification number, the RFID transceiver can communicate this number to the personal computer. The personal computer, in turn, transmits this number, along with any other required identification data, to the remote device management system for verification.

Therefore, it is an object of the present invention to provide a secure remote computer management system that utilizes RFID technology to prevent unauthorized access to the system, or restrict access to authorized users.

It is yet another object of the invention to provide a remote computer management system that requires the presence of an RFID tag in order to allow a user to access remote computers and devices through a user workstation.

It is another object of the present invention to provide a secure keyboard, video, and mouse switching system in which user workstations can only be used to access remote devices by users with valid RFID tags.

It is still another object to provide a secure remote computer management system that uses an RFID system to securely allow access to remote computers and devices from any Internet-enabled device.

It is yet another object of the invention to allow information technology ("IT") personnel to more efficiently and securely manage a volume of servers for both small-scale and large-scale computer centers such as data-centers, server-farms, web-hosting facilities and call-centers.

In addition, it is an object of the present invention to provide a remote computer management system that minimizes the space required to house the computers, peripheral devices and the overall computer management system while providing secure access to the computers avoiding the security problems inherent in existing systems.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
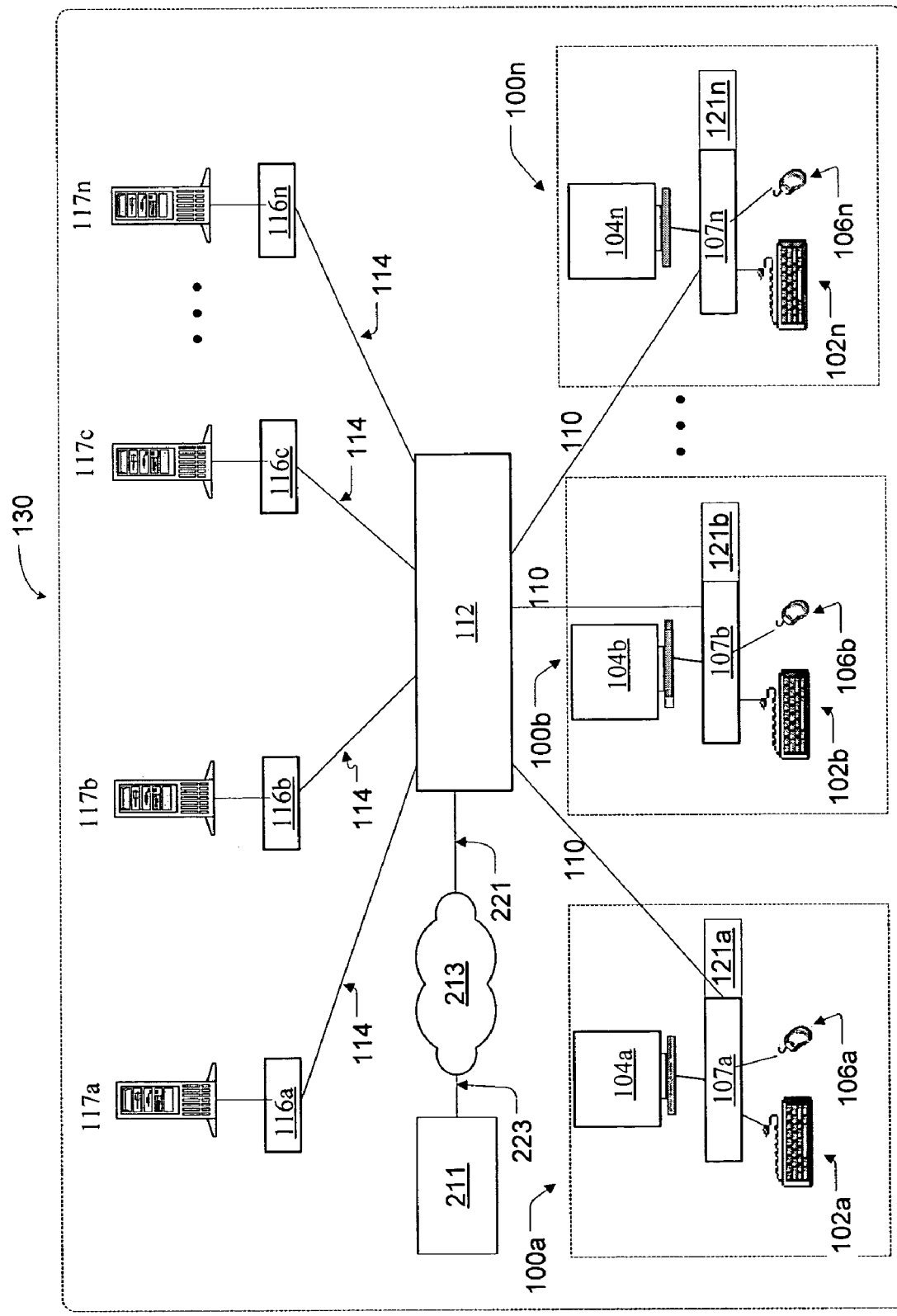
FIG. 1 depicts a schematic representation of a remote computer management switching system, including a user station ("UST") coupled to an RFID transceiver, a switching unit ("MSU") and a computer interface module ("CIM"), in accordance with the preferred embodiment of the invention.

Referring first to FIG. 1, depicted is the architecture of the preferred remote computer management system in accordance with the present invention. Specifically, an intelligent modular computer management system is shown including a centrally located matrix switching unit ("MSU") 112, user stations ("USTs") 107a-n having attached keyboards 102a-n, video monitors 104a-n, and cursor control devices 106a-n, and computer interface modules ("CIMs") 116a-n each connected to a remote computer 117a-n, where "n" is an integer. Each UST 107a-n and each CIM 116a-n is preferably connected to MSU 112 via connections 110 and 114, respectively, which are preferably Category 5 Universal Twisted Pair ("CAT5") cables. MSU 112 is connected to remote authentication server ("RAS") 211 via network 213 and connections 221 and 223. Further, each UST 107a-n includes or is in communication with an RFID transceiver 121a-n. Alternatively, the invention may be used in a non-modular computer management, a computer switching system, or other system requiring secure access.

Although single CAT5 cabling is the preferred cabling for use with the present invention, wireless connections or other cabling may be used, such as coaxial, fiber optic or multiple CAT5 cables, depending on the specific needs of the system user. CAT5 cabling is preferred because it reduces cabling cost while maintaining the strength of signals that are transmitted over extended distances. Additionally, the use of single CAT5 cabling minimizes the space required to house the computer system and its associated wiring. Alternatively, the cables described for use with the invention may be replaced with known wireless communication devices and/or circuitry.

Individual CAT5 cables may be used for connection of each UST 107a-n and each CIM 116a-n to MSU 112. Conventional CAT5 cables include four (4) twisted pairs of wires. The present invention utilizes three (3) of these twisted pairs for the transmission of video signals. Each of the three (3) twisted pairs transmits one of the three video color signals (i.e., red, green or blue). To allow all video signals to be transmitted via only three (3) twisted pairs, the horizontal and vertical synchronization signals, which would otherwise each require their own twisted pair, are individually encoded on one of the three color video signals. For example, the vertical synchronization signal may be encoded on the blue video signal while the horizontal synchronization signal may be encoded on the green video signal. All other non-video signals such as keyboard, cursor control device, and audio signals, are transmitted via the fourth twisted pair of wires.

Connections 110 and 114 are preferably connected to UST 107a-n, MSU 112 and CIM 116a-n by plugging each end into a RJ-45 connector located on these respective components to be coupled by connections 110 and 114. Although RJ-45 connectors are preferred, other types of connectors may be used, including but not limited to RJ-11, RG-58, RG-59, British Naval Connector ("BNC"), ST connectors, or any other known type of connectors.

The remote computer management system includes local user workstations 100a-n, each preferably comprising dedicated peripheral devices such as keyboard 102, video monitor 104 and/or cursor control device 106. Other peripheral devices may also be located at workstation 100, such as printers, scanners, video camera biometric scanning devices, microphones, etc. Each peripheral device is directly or indirectly connected to UST 107a-n, which is attached to MSU 112 via connection 110. USTs 107a-n preferably include USB and PS/2 ports to support connections of many peripheral devices. Wireless peripheral devices may also be used with this system.

According to the preferred embodiment of the invention, each UST 107a-n can only be operated by a valid user, as determined by the presence of an authorized RFID tag. Specifically, each UST 107a-n is in communication with an RFID transceiver 121a-n. RFID transceivers 121a-n sense the presence of RFID tags and communicate RFID tag identification information to UST 107a-n. The system verifies that the identification information is valid and thus verifies that the user is authorized to access UST 107a-n. For example, RAS 211 may be used to receive the identification information and to determine the user's accessibility to the system. A user may be restricted to access only certain remote computers 117a-n or to perform only certain functions, as determined by the identification information from the RFID tag. The RFID technology of the present invention is discussed below in further detail with respect to FIGS. 2 and 3.

Once the system verifies the presence of an authorized user, a UST 107a-n can be used to select and remotely control a computer, server, hub, switch, etc., in accordance with the KVM or remote management system. During operation, all electronic signals received at a UST 107a-n from attached peripheral devices are transmitted to MSU 112 via connection 110. Thereafter, signals are transmitted to a desired CIM 116a-n via connection 114. Each CIM 116a-n, being coupled to a remote computer 117a-n, interprets the received signals to emulate and transmit signals to the respective ports of the particular remote computer 117a-n.

Preferably, each CIM 116a-n is compatible with all commonly used, present day computer operating systems and protocols, including but not limited to those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including, but not limited to, USB, ASCII, and RS-232.

Remote device management system 130 may also be configured to connect varying quantities of user workstations 100a-n with varying quantities of remote computers 117a-n. One of skill in the art will note that remote devices other than computers may also be managed by remote device management system 130. Preferably, the system according to the present invention allows eight (8) USTs 107a-n and thirty-two (32) CIMs 116a-n to be connected via one (1) MSU 112 while still achieving optimal signal transmission. If additional USTs or CIMs must be added, the system allows a plurality of MSUs 112 to be utilized to connect as many as sixty-four (64) user workstations 100a-n and ten thousand (10,000) remote computers 117a-n.

Selection of a remote computer 117a-n may be accomplished with a variety of methods. One such method is choosing a remote computer 117a-n from a menu or list displayed on the screen of the user station's video monitor 104a-n. The menu may be generated by a CPU within UST 107a-n and displayed as a graphical user interface (GUI) on the user station's video monitor 104a-n. A general purpose CPU within each UST 107a-n implements an operating system such as Windows Compact Edition ("CE"), LINUX, etc. enabling the GUI to be developed with standard APIs available as part of these operating systems. The same CPU is also preferably programmed to interact with RFID transceiver 121a-n of the present invention.

Figure 2:
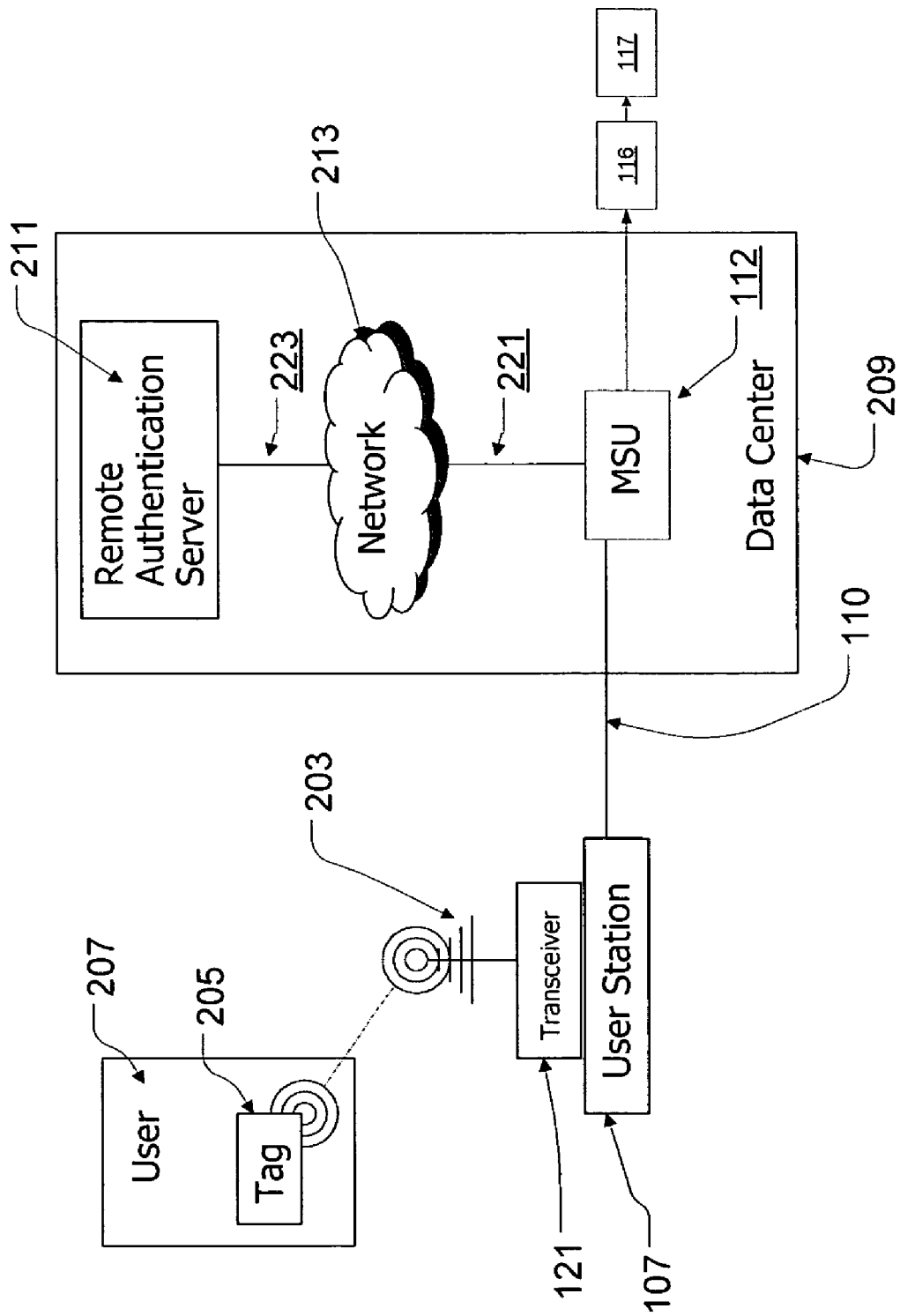
FIG. 2 depicts a schematic representation of the preferred embodiment of the RFID system according to the invention, illustrating the communication between the RFID transceiver and RFID tag, and the connection of a remote access center to a user station.

Turning next to FIG. 2, depicted is a schematic diagram illustrating the utilization of RFID security technology in conjunction with a KVM system such as the one depicted in FIG. 1 in accordance with the present invention. Preferably, UST 107 is in communication with RFID transceiver 121. RFID transceiver 121 also comprises antenna 203 which is used in the transmission of radio signals to activate RFID tags 205 worn, held, or otherwise carried by users 207. RFID transceiver 121 is preferably coupled to or embedded in UST 107. One possible configuration is to couple RFID transceiver 121 to UST 107 as a peripheral device (i.e., using a serial connection, USB connection, Bluetooth connection, etc.). Off the shelf USB compatible RFID transceivers are available from, among others, companies such as Alien Technology, Matrics, and SkyeTek. These companies also sell and manufacture RFID tags.

As is known in the art, RFID tag 205 and RFID transceiver 121 must be configured to use the same frequency range in order to communicate properly. RFID systems generally use low, high or ultra-high frequency ("UHF") ranges for communication. Higher ranges of frequency communications generally offer better range and faster transfer of data. Thus, preferably, RFID tag 205 and RFID transceiver 121 use the UHF range of communication to offer a range of communication that allows a user to sit at a comfortable distance from the RFID transceiver 121 while still allowing the RFID tag 205 and RFID transceiver 121 to communicate.

RFID transceiver 121 communicates with RFID tag 205 via radio communications. RFID transceiver 121 sends an activation signal, which (1) provides power to RFID tag 205, and (2) instructs RFID tag 205 to respond with identification information. The response is in the form of radio communications in the same frequency range as the activation signal. Preferably, the identification information comprises a 64-bit unique identifier (although other sized identifiers may also be used). A 64-bit unique identifier enables enough possible values for RFID tag 205 to offer a globally unique identification number. Thus, one RFID tag 205 can be used to as an identifier for many different systems if RFID tag 205 and RFID transceiver 121 are configured to use the same range of frequencies for communications.

This method of communication enables RFID tag 205 to be passive. That is, RFID tag 205 requires no external power source. An active tag requires a power source whereas a passive tag requires no power source and responds to signals emitted from RFID transceiver 121. Using a passive tag is preferred because it allows a small, lightweight, and inexpensive implementation of RFID tag 205, which is activated only upon receipt of radio waves from antenna 203.

RFID transceiver 121 preferably contains antenna 203 to receive radio communications from RFID tags 205. RFID transceiver 121 then demodulates the information to extract the globally unique identifier. Next, RFID transceiver 121 communicates this information to the system to verify the user.

As described above, RFID transceiver 121 may be incorporated within or coupled to UST 107. Preferably, one RFID transceiver 121 is used for every UST 107. Alternatively, multiple USTs 107 can share one RFID transceiver 121 such that user 207 may access any of these USTs 107 if within range. The system according to the present invention can be implemented in a variety of configurations in which one or more USTs 107 communicate with one or more RFID transceivers 121.

As is known the art when multiple RFID transceivers 121 are in close proximity, reader collision (i.e., the RFID signal from one reader interfering with the signal from another) can occur. Another problem, tag collision, may also occur, in which more than one RFID tag 205 responds to an activation signal from RFID transceiver 121. As is known in the art methods exist to avoid these collisions, such as time division multiple access ("TDMA"), which synchronizes multiple RFID transceivers 121. The system can also be configured so that if one RFID transceiver 121 reads an RFID tag 205, another reader subsequently ignores that tag. Optionally, the system may prevent users from logging on to multiple computers in one network.

In one embodiment, verification of the presence of an authorized RFID tag 205 is completed by UST 107. That is, RFID transceiver 121 receives the global identification number from RFID tag 205. This identification number is then communicated from RFID transceiver 121 to UST 107. UST 107, utilizing a database of acceptable identification numbers (or equivalents), verifies whether the received identification number is authorized for access to the remote management system. Once verification is complete, UST 107 enables user 207 to access the system and any remote computer connected to the system. Alternatively, the system may limit access to user 207 to only certain portions or features of the system (i.e., user 207 may only be granted access to certain remote devices on the system, or may be limited to performing certain functions on the system, etc.). Without the presence of a valid RFID tag 205, UST 107 is preferably inaccessible (i.e., it cannot be used to view, monitor or select remote devices). Other security measures may be used in conjunction with the RFID technology including identification numbers, passwords, biometric identification information, etc.

Alternatively, verification of an authorized RFID tag 205 may be completed by one or more RAS 211 or MSU 112 located at data center 209. As depicted in FIGS. 1 and 2, UST 107 communicates with MSU 112 via connection 110. In the embodiment depicted in FIG. 1, this communication is over a CAT5 cable. However, as will be discussed with respect to FIG. 8, the communication between MSU 112 and UST 107 may be digital and may be through a LAN, WAN, WLAN, or Internet connection. MSU 112 can also support dial-in connections through a modem. In turn, MSU 112 may communicate with RAS 211 via any communication means. As depicted in FIG. 2, this communication means is network 213. When either MSU 112 or RAS 211 is utilized for verifying a user, the identification information from RFID tag 205 is received by RFID transceiver 121 and communicated (optionally through UST 107) to MSU 112 and/or RAS 211. MSU 112 and/or RAS 211 verify that the identification information represents a valid user and sends verification information back to UST 107. Such a system of remote verification may be preferred because the verification is performed at a site that may be remote from user 207. This system helps prevent an unauthorized accessing the hardware and/or software that performs the verification process.

Figure 3:
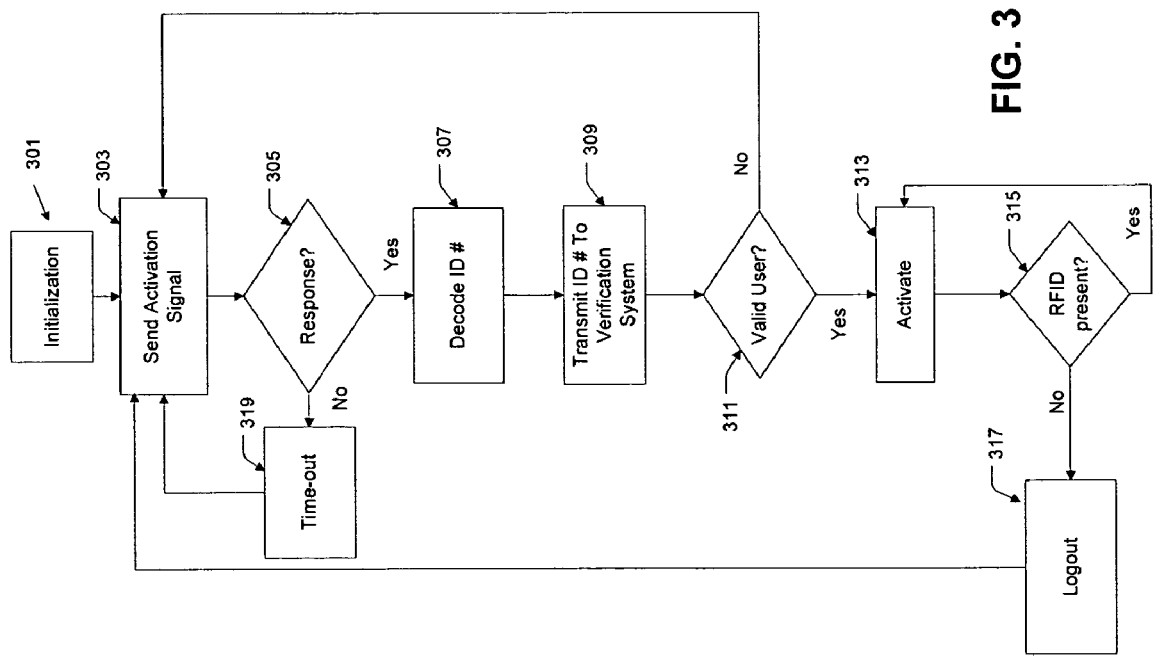
FIG. 3 is a flow diagram depicting the preferred process used to verify the presence of a verified RFID tag in accordance with the RFID system according to the present invention.

Referring next to FIG. 3, depicted is a flow chart illustrating the process used to verify the presence of a valid RFID tag 205. The process begins with initialization (step 301). Initialization may involve powering-on the components of the system, establishing communication between RFID transceiver 121 and UST 107, loading software and appropriate databases, or any other initialization functions necessary to activate the system. Next, RFID transceiver 121 transmits an activation signal (step 303) that is used to illicit a response from RFID tag 205. After sending the activation signal, RFID transceiver 121 waits for a response for a predetermined period of time (step 305). If no response is received by RFID transceiver 121 in the predetermined period of time, the system is timed out (step 319) and another activation signal is sent out (step 303).

Once RFID transceiver 121 receives a response, the response is decoded (step 307). Specifically, the RFID globally unique identification number is decoded by RFID transceiver 121, and verified for authorization to use UST 107 (step 309).

During the verification process, UST 107 waits for a response from the component that implements the verification process (step 311). If the verification process indicates a valid RFID identification number, UST 107 is activated for use (step 313). If the identification number is determined to be invalid, access is denied and the system again sends out an activation signal (step 303). Optionally, future responses from the same RFID tag 205 may be ignored so as to prevent undue burden on the system. Also, the system may display a message on the screen notifying the user of the denial of access, and may include information for contacting an administrator to evaluate the situation. Further, the system may optionally notify an administrator that an unauthorized user attempted to gain access to the system.

An important advantage of the RFID security of the present invention is that it can monitor the continued presence of a valid RFID tag 205 without additional user interaction. Specifically, RFID transceiver 121 can periodically or continuously transmit activation signals that should elicit responses from the RFID tag 205 (step 315). Thus, if RFID tag 205 has moved out of range (e.g., the user leaves but does not log-out), no such response will be received, and UST 107 automatically logs the user out (step 317) making the system inaccessible. If RFID tag 205 does respond, the system remains active (step 313). Optionally, the system could remain active until the user manually logs out. This system may be used independently or in conjunction with other aforementioned security measures such as user passwords, biometric identification information, etc.

Figure 4:
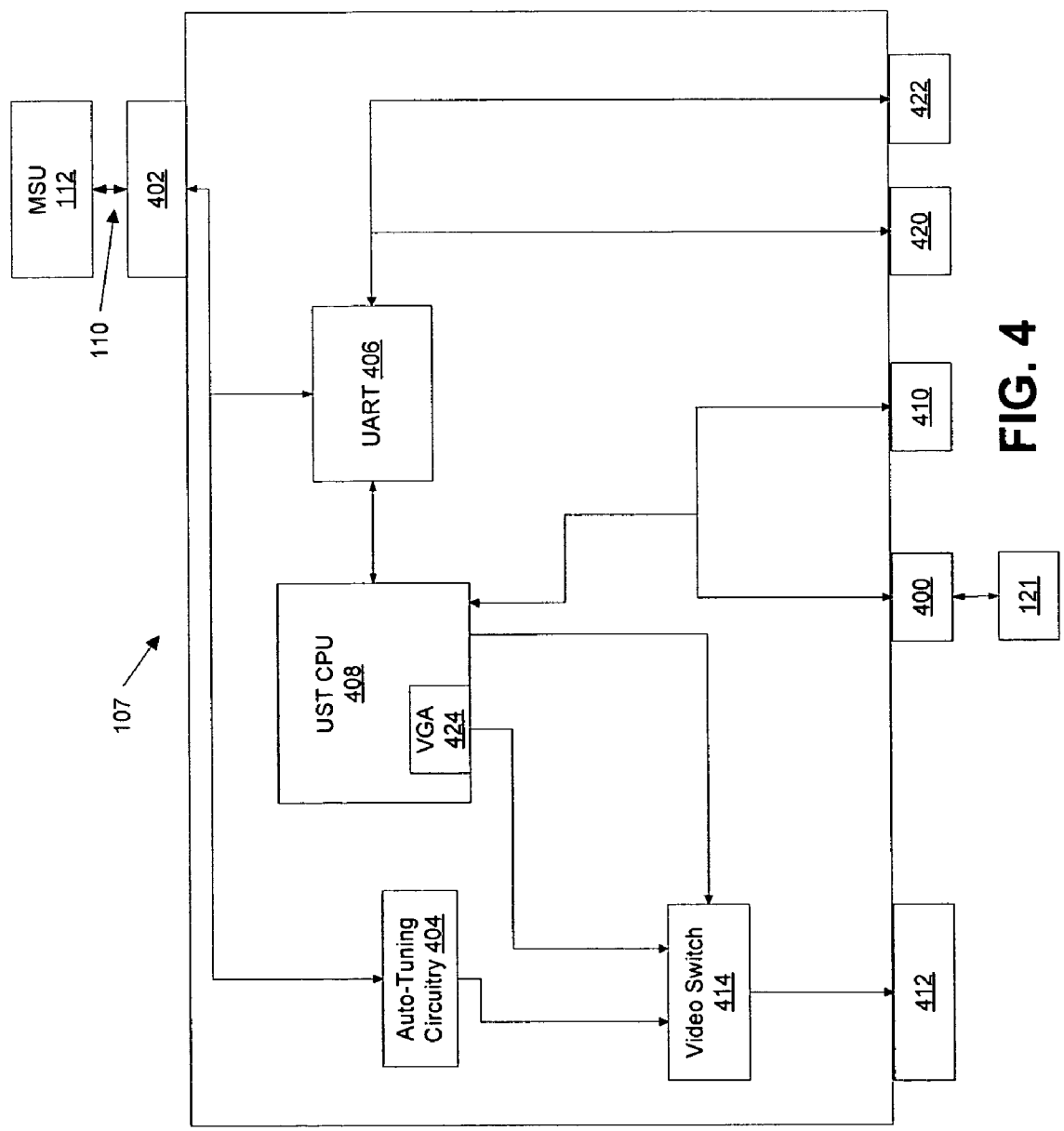
FIG. 4 is a block diagram of the preferred embodiment of the USTs shown in FIG. 1, illustrating its internal structure and the connections to the RFID transceiver and to peripheral devices.

Turning next to FIG. 4, shown is a schematic diagram of the preferred internal structure of each UST 107*a-n* according to the present invention. As illustrated in FIG. 1, UST 107 interfaces keyboard 102, video monitor 104, and cursor control device 106 with MSU 112 for connection to any of a plurality of remote computers 117*a-n*. To accomplish this, each UST 107*a-n* preferably includes video port 412, USB ports 400 and 410, and PS/2 ports 420 and 422. If keyboard 102 and cursor control device 106 are USB compatible, then they are preferably connected to USB ports 400 and 410. However, if keyboard 102 and cursor control device 106 are PS/2 devices, then they are connected to PS/2 ports 420 and 422. USB ports 400 and 410 can also be utilized for other USB devices (e.g., printers, scanners, biometric identification devices, etc.). As shown, one USB port may be used to interface RFID transceiver 121 to UST 107. Other interfaces (serial, PS/2, Bluetooth, etc.) may also be utilized. Preferably, UST 107 is upgradeable through utilization of a USB flash disk, which interfaces with UST 107 through one of USB ports 400 or 410. Because both USB ports 400 and 410 and PS/2 ports 420 and 422 are capable of communicating data from keyboard 102 and cursor control device 106, it should be understood that UST 107 need not have all four (4) ports. Alternatively, UST 107 may also include more USB ports or PS/2 ports than illustrated in FIG. 4. For example, if UST 107 is used with a USB keyboard, USB cursor control device and a USB RFID transceiver 121, then it would be necessary to include three (3) USB ports, or, alternatively, a USB hub with UST 107.

During operation, signals from keyboard 102 and cursor control device 106 generated at the local work station 100 are received by UST CPU 408 from either ports 420 and 422 via UART 406 or ports 400 and 410, or some combination thereof, depending on the type of keyboard 102 and cursor control device 106. Data packets representing the keyboard and cursor control device information in the received signals are generated by UST CPU 408. The newly generated data packets are transmitted back to UART 406, whereupon they are converted to a serial format and transmitted through port 402 to MSU 112 via independent cable 110. It should be noted that the converted data packets may alternatively be transmitted via a wireless connection, thereby eliminating the need for cable 110.

Figure 7:
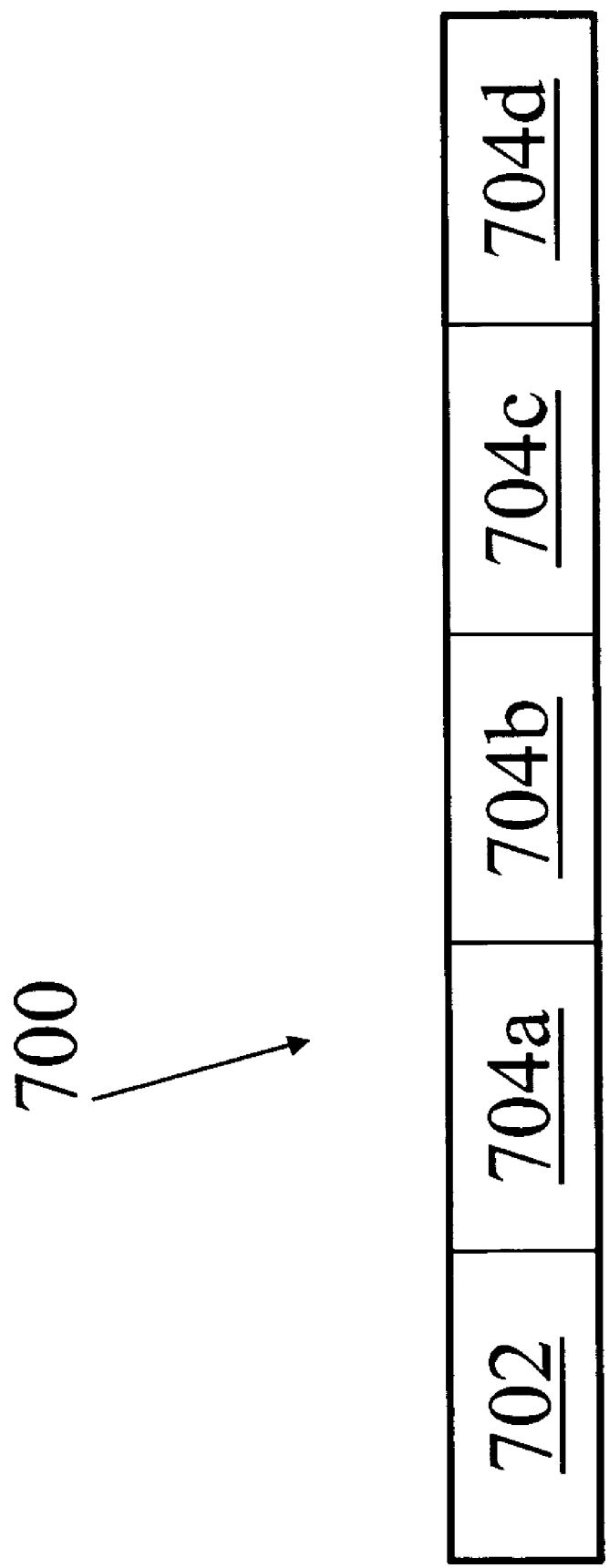
FIG. 7 is a diagram of a sample data packet that may be used to transmit data in the system according to the preferred embodiment of the present invention.

An example of a data packet used to transmit keyboard and mouse information is shown in FIG. 7. As shown, protocol data packet 700 consists of five (5) bytes. First byte 702 comprises the instructional, or command, data and data regarding the total length of data packet 700. That is, the first half of first byte 702 contains the command data and the second half of first byte 702 contains the length data. The subsequent four (4) bytes 704a-d include the characters typed on keyboard 102 and clicks performed with cursor control device 106 (FIG. 1).

It is well known in the art to transmit command and length data in separate bytes. Therefore, utilizing conventional data packet technology, the data packet of the present invention would need to contain six (6) bytes (i.e., one byte for command data, one byte for length data and four bytes for system data). In contrast, in the preferred embodiment of the present invention the size of the data packet is minimized by combining the command and length data into one byte, thereby allowing four (4) bytes of system data to be transmitted in a five-byte data packet. Consequently, signal transmission in the intelligent, modular server management system of the present invention is more efficient, allowing a single CAT5 cable to be used for transmission of keyboard, mouse and video signals.

Conversely, keyboard and cursor control device signals received from the remote computer through MSU 112 via cable 110 (or wirelessly) are received via port 402. Thereafter, UART 406 de-serializes the serial data packet signals and transmits them to UST CPU 408. Alternatively, a non-UART device may be used to de-serialize the received serial data packets. UST CPU 408 then uses the information contained in the data packet signals to emulate keyboard and cursor control device signals. These emulated signals are applied to keyboard 102 and cursor control device 106 via USB Ports 400 and 410, PS/2 ports 420 and 422 or some combination thereof, depending on the type of keyboard 102 and cursor control device 106 being used.

Unidirectional video signals generated at the remote computer are also received at port 402 from MSU 112 via cable 110. However, these video signals are transmitted to tuning circuit 404, which conditions the video signals to a desired amplitude and frequency.

Figure 5:
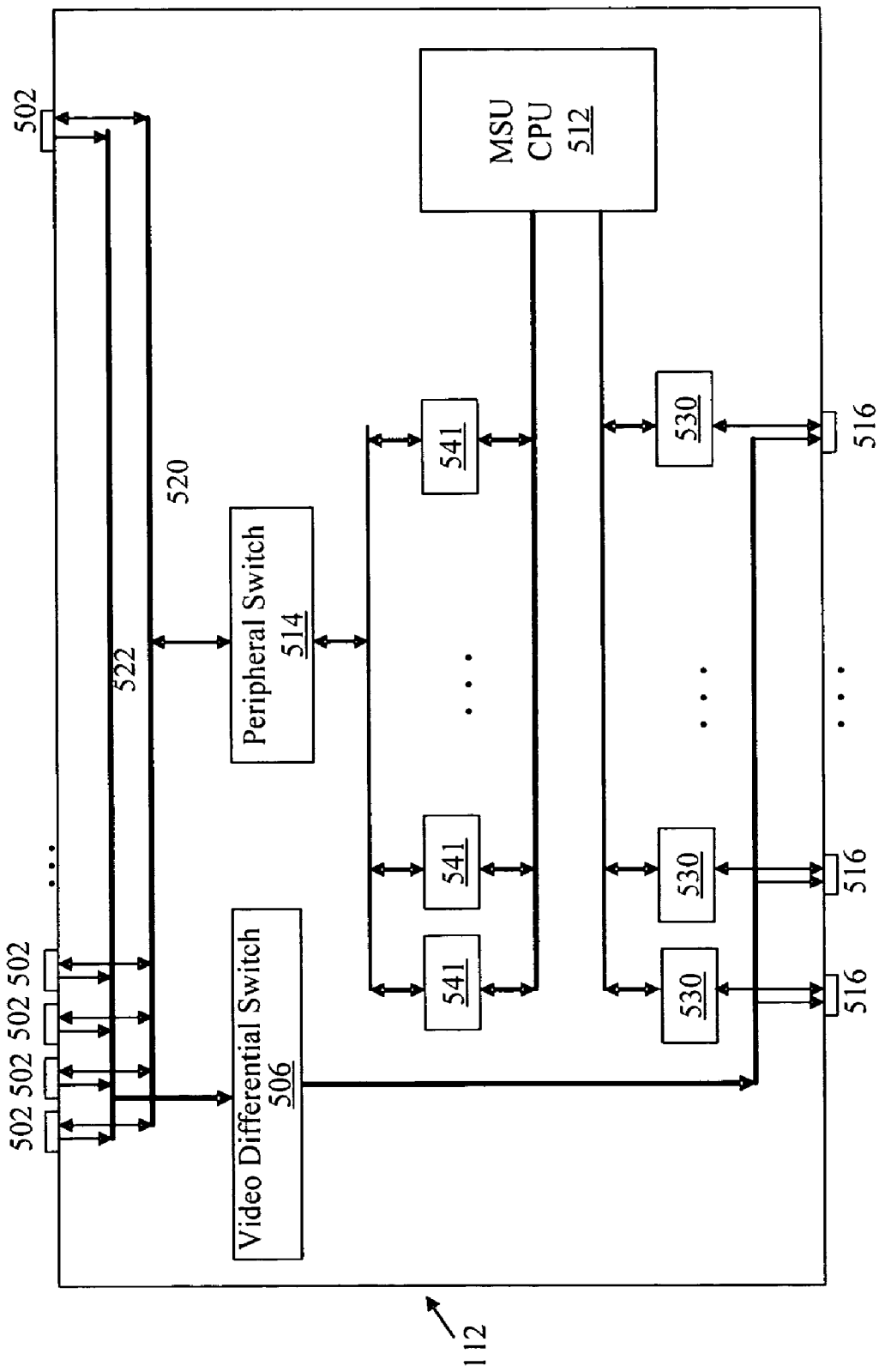
FIG. 5 depicts a block diagram of the preferred embodiment of the MSU shown in FIG. 1.
Figure 6:
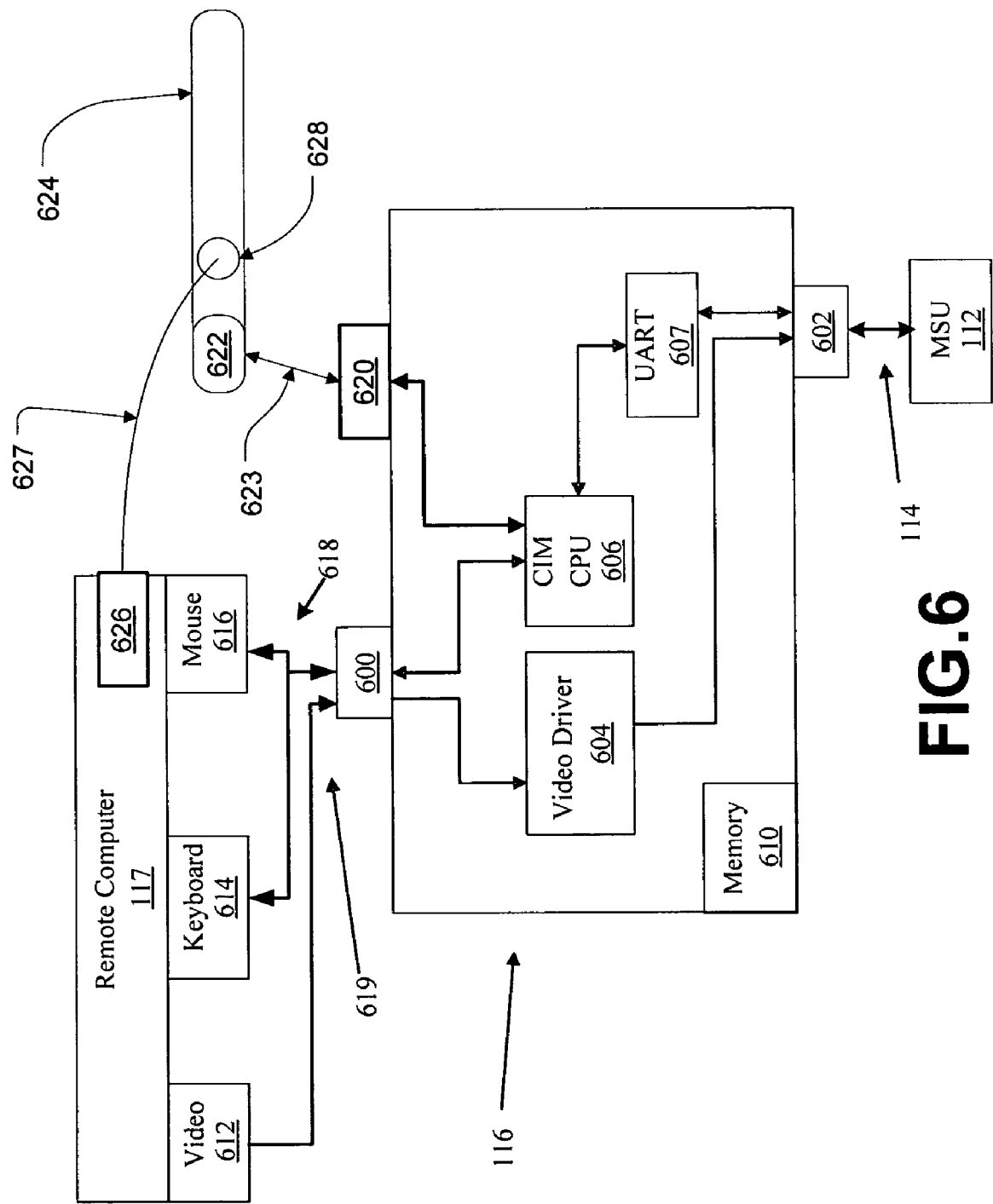
FIG. 6 depicts a block diagram of the preferred embodiment of the CIMs shown in FIG. 1.

During operation of the system, the keyboard, video, and cursor control device signals from remote computer 117 are transmitted via cable 619 to CIM 116 (FIG. 1 and FIG. 6). Thereafter, the video signals and data packets generated by CIM CPU 406 are transmitted from CIM 116 to MSU 112 via connection 114. The video signals and the signals generated by MSU CPU 512 (FIG. 5) are transmitted from MSU 112 to UST 107, wherein the video signals are received by tuning circuit 404. Tuning circuit 404 is implemented to automatically tune the received signals to achieve a desired amplitude and frequency.

Optionally, UST 107 may incorporate circuitry to selectively compensate for the high-frequency attenuation that often occurs when signals are transmitted over extended distances. An example of such circuitry is disclosed in co-pending patent application Ser. No. 10/740,381, which is hereby incorporated by reference in its entirety. UST 107 may also incorporate skew compensation circuitry to compensate for the different pitch (and thus different cable length) of the twisted pair over which the red, green, and blue components of the video signal are transmitted. An example of such circuitry is disclosed in co-pending patent application Ser. No. 10/735,246, herein incorporated by reference in its entirety.

The utilization of a general purpose CPU (UST CPU 408) allows for the production of an enhanced option menu for display on video monitor 104. The option menu is preferably comprised of a graphical user interface ("GUI") that enables a user to efficiently view lists of available remote devices. The GUI also enables a user to select a desired remote device (i.e., remote computer or server) to monitor and control. Preferably, UST CPU 208 uses an operating system such as Windows Compact Edition (Windows CE) or LINUX. This enables UST CPU 208 to communicate with and to control all components of UST 107 (UART 206, video switch 214, and all I/O ports), while simultaneously producing an enhanced option menu. Alternatively, an on-screen display ("OSD") device may be used to provide a more rudimentary user interface. Regardless of the specific hardware used, video signals representative of this option menu are output from UST CPU 408 at video-out 424, which is coupled to video switch 414. Video switch 414 selects either video from video out 424 or video from tuning circuit 404 for display on video monitor 404.

Referring now to FIG. 5, depicted is a block diagram of the preferred embodiment of MSU 112. MSU 112 enables multiple users to access and operate any of a plurality of remote computers 117 from any of a plurality of workstations 100 (see FIG. 1). It is apparent to one of skill in the art that other remote devices may be additionally monitored depending on the type of KVM switch or remote device management unit used. Access by a user to one of remote computers 117 from one of local user workstations 100 is performed completely via one or more MSUs 112, independent of any network that may couple the remote computers to each other such as a LAN, WAN, etc. In other words, remote device management system 130 according to the present invention does not require an existing computer network to allow a local user workstation 100 to control remote computers 117. Rather, all physical connections between local user workstations 100 and remote computers 117 occur through MSU 112.

Preferably, MSU 112 comprises a plurality of CIM ports 502 that are preferably RJ-45 sockets, which allow each CIM 116 to be connected to MSU 112 via an independent cable 114 (FIG. 1). The unidirectionally transmitted (i.e., from the remote computer to the user workstation only) video signals are received from remote server 117 at MSU 112 through CIM ports 502 onto video bus 522, whereupon the video signals are transmitted to video differential switch 506. Video differential switch 506 is capable of transmitting any video signals received from video bus 522 to any UST port 516. The transmitted video signals are then transmitted via independent cable 110 to attached UST 107 (FIG. 1).

In addition to transmitting the unidirectional video signals, MSU 112 bi-directionally transmits keyboard and mouse signals between USTs 107a-n and CIMs 116a-n (FIG. 1). When transmitting the keyboard and mouse signals from one of CIMs 116 to one of USTs 107a-n, these signals are received through CIM ports 502 on peripheral bus 520, whereupon they are transmitted to peripheral switch 514. Thereafter, peripheral switch 514 transmits these signals to the appropriate CIM UART 541, which de-serializes the signals (i.e., converts the signals from a serial format to a format that is compatible with MSU CPU 112, e.g., parallel format) and transmits them to MSU CPU 512. MSU CPU 512 analyzes the received signals and generates a new data packet based upon command information contained within the received signals. This new data packet is transmitted to the appropriate UST UART 530, which serializes the signals and transmits them to the appropriate UST port 516 for transmission via independent cable 110 to the appropriate UST 107a-n (FIG. 1).

Conversely, MSU 112 also transmits keyboard and mouse signals received from a workstation 100a-n at one UST 107a-n to a CIM 116a-n connected to a selected remote computer 117a-n (FIG. 1). In this aspect, the keyboard and mouse signals are received at UST 107 and transmitted to the respective UST port 516 located at MSU 112. Thereafter, these signals are transmitted to UST UART 530, which de-serializes the signals and transmits them as data packets to MSU CPU 512. MSU CPU 512 interprets the information contained in the data packets of the received signals to create new (or emulated) signals, which also represent newly generated data packets. These new signals are then transmitted to the CIM UART 607 (see FIG. 6) that is associated with the desired remote computer 117*a-n*. CIM UART 541 serializes the signals and transmits them to peripheral switch 514, which transmits the signals to the desired CIM port 502 via peripheral bus 520. Subsequently, the keyboard and mouse signals are transmitted to the appropriate CIM 116, which is connected to the desired remote computer 117 (FIG. 1).

Turning next to FIG. 6, shown is a block diagram of the preferred embodiment of each CIM 116*a-n*. Initially, each CIM 116*a-n* may be configured to be compatible with any known computer system, including but not limited to those manufactured by Microsoft (Windows), Apple (Macintosh), Sun (Unix), DEC, Compaq (Alpha), IBM (RS/6000), HP (HP9000) and SGI. However, it is foreseeable that the technology of the present invention will also be compatible with those computer systems not yet contemplated.

CIM 116 serves as the interface circuit connecting remote computer 117 with MSU 112. Specifically, CIM 116 interfaces video port 612, keyboard port 614 and cursor control device port 616 of remote computer 117 to MSU 112 (e.g., via CAT5 cable 618 and port 600, or wirelessly). Video signals are unidirectionally transmitted from remote computer 117 to MSU 112 through CIM 116. However, keyboard and cursor control device signals may be transmitted bi-directionally between remote computer 117 and MSU 112.

During operation, video signals are transmitted from video port 612 of remote computer 117 to port 600 of CIM 116 via direct connection 619. From port 600, the unidirectional video signals are transmitted to video driver 604, which converts the standard red, green and blue video signals to a differential signal for transmission through port 602 to MSU 112 via cable 114. Each color signal is transmitted via its own twisted pair of wires contained within cable 114 (when transmitted from CIM 116 to MSU 112) or cable 110 (when transmitted from MSU 112 to UST 107) (FIG. 1). Furthermore, video driver 604 encodes the horizontal and vertical synchronization signals to one of the red, green or blue video signals to allow all five (5) components of the video signals to be transmitted via only three (3) twisted pairs of wires of cables 110 or 114. That is, the horizontal and vertical synchronization signals are each transmitted on its own color signal.

Keyboard and cursor control device signals generated at remote computer 117 are received by CIM CPU 606 from keyboard port 614 and cursor control device port 616, respectively, via cable 618 and port 600. Data packets representing the keyboard and cursor control device information in the received signals are generated by CIM CPU 606. The newly generated data packets are transmitted to UART 607, which serializes the signals and transmits them via cable 114 to MSU 112 through port 602.

Keyboard and cursor control device signals received from the local user workstation through MSU 112 and connection 114 (FIG. 1) are received at port 602. Alternatively, the received data packet signals may be de-serialized by a non-UART device. CIM CPU 606 uses the information contained in the data packet signals to emulate keyboard and mouse signals. These emulated signals are applied to keyboard port 614 and mouse port 616 through port 600 via connection 618.

Furthermore, CIM 116 preferably contains memory unit 610 to store identification information for CIM 116 and the connected remote computer 117, including information such as its assigned name, group, address, etc. Thus, if a specific remote computer 117 is not functioning properly, it is easy to identify which remote computer 117 has malfunctioned. In addition, the address of each CIM 116 facilitates proper transmission of the keyboard and mouse signals since such address is included in the keyboard and mouse data packets generated by MSU CPU 512. For example, if CIM 116 receives a data packet containing an address other than its own address, the data packet will be returned to MSU CPU 512 for retransmission to the proper CIM 116. Furthermore, memory unit 610 allows CIM 116 and its connected remote computer 117 to be easily identified even if it is relocated and/or connected to a new MSU 112 or a new port of the same MSU 112. Upon reconnection of CIM 116, MSU 112 reads the identification information stored in memory unit 610. This information allows MSU 112 to reconfigure or update the location of CIM 116, which ensures that the system continues to properly route information to CIM 116 and connect the appropriate workstation 100*a-n* to the desired remote computers 117*a-n*. This feature allows system administrators to easily re-organize CIMs 116*a-n* and remote computers 117*a-n* without re-programming the system.

CIM 116 may also contain circuitry to aid a system administrator in locating a remote server if the remote server has a problem. Such circuitry, disclosed in co-pending patent application Ser. No. 10/667,132, which is incorporated by reference in its entirety, is especially useful in large scale operations such as server-farms, web-clusters, etc.

Finally, in the preferred embodiment of the present invention, CIM 116 may control the power of its connected remote computer 117. Specifically, CIM CPU 606 communicates serial data to serial port 620, which in turn communicates serially with serial port 622 of power-strip 624 through connection 623. Remote computer 117 receives power through power connection 626 over power cable 627 from outlet 628 of power-strip 624. As is known in the art, power-strip 624 can be controlled with instructions transmitted through serial port 622. UST 107 provides a GUI menu that includes options for a user to cycle the power of a server under the user's control. If the user chooses to cycle the power, data sent through MSU 112 to CIM 116 will indicate that the power source of remote computer 117 should cycled. CIM CPU 606 provides the appropriate instruction serially to serial port 622 of power-strip 624, which then cycles the power of remote computer 117 through outlet 628. This may also be performed wirelessly, as discussed regarding UST 107 and CIM 116.

Advantageously, the RFID technology of the present invention is compatible with all types of KVM switches and remote management systems. With respect to FIGS. 1-6, RFID transceiver 121 has so far been described as interfaced with UST 107 so that UST 107 only enables authorized users to access remote computers 117. However, RFID transceiver 121 can also be used with remote device management systems that allow a user at a standard or specialized computer to access remote devices over an Internet connection, WAN, LAN, wireless connection, or modem. In such a configuration, RFID transceiver 121 interfaces with a user workstation in a manner similar to how RFID transceiver 121 interfaces with UST 107 (e.g., through a USB, serial, PS/2, or Bluetooth connection, or equivalent). The user workstation remains locked until RFID transceiver 121 receives a response from a valid RFID tag 205. For example, the user workstation may be "logged-out", or, alternatively, software on the user workstation may prevent the user from viewing, selecting or operating the remote computers. Also, as previously discussed, RFID transceiver 121 can periodically send authorization messages to ensure that RFID tag 205 is still within range.

Figure 8:
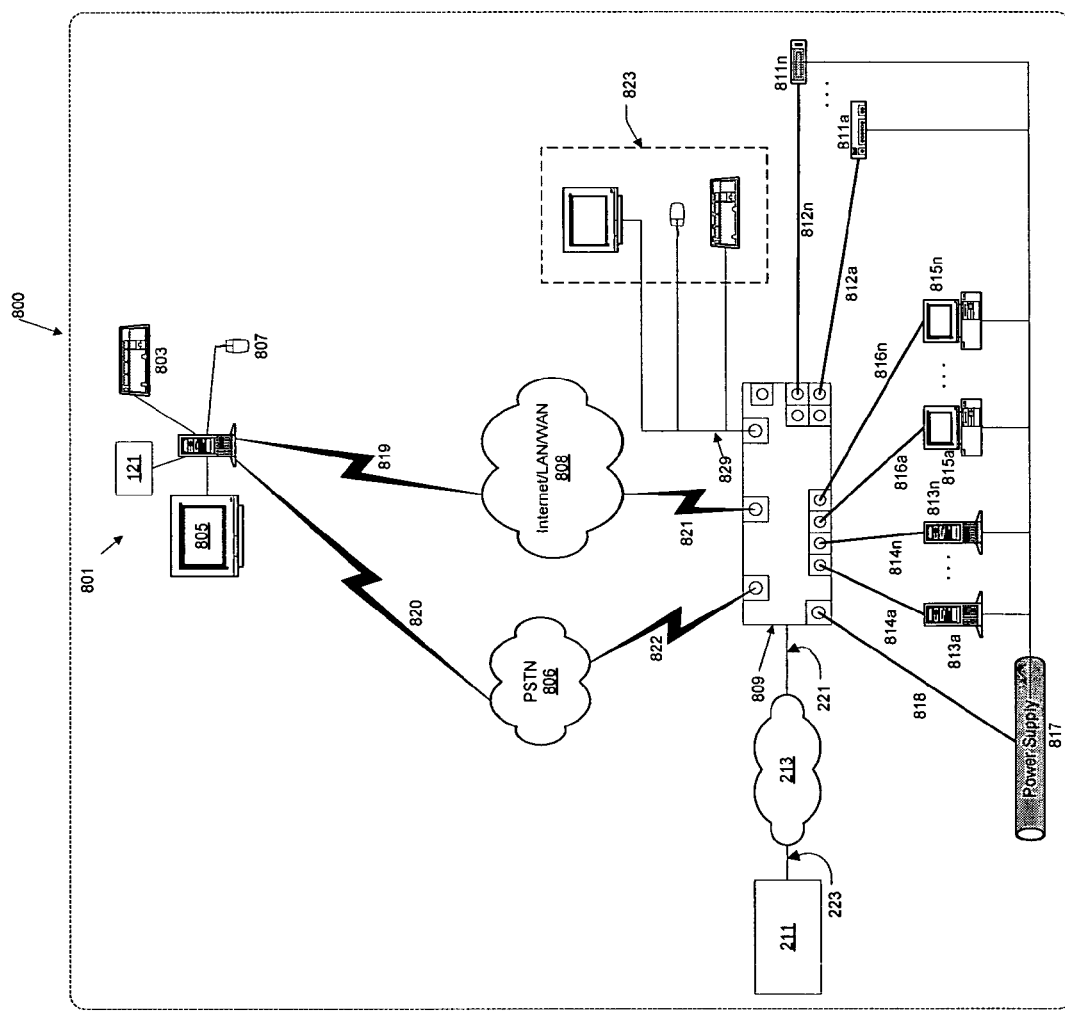
FIG. 8 depicts a schematic representation of a remote network management system, illustrating the connection of a user workstation that includes a keyboard, video monitor, cursor control device and RFID transceiver to networking equipment, servers, and computers through a remote management unit ("RMU"), in accordance with an alternate embodiment of the invention.

An example of the use of an RFID security system in conjunction with a remote device management system is depicted in FIG. 8. Specifically, remote network management system 800 is shown comprising one or more user workstations 801 including keyboard 803, video monitor 805, cursor control device 807 and RFID transceiver 121, RMU 809, local administrative KVM station 823, Internet/LAN/WAN 808, public switched telephone network ("PSTN") 806, RAS 211, serial devices 811a-n, servers 813a-n, remote computers 815a-n, and power supply 817. Preferably, user workstation 801 and RMU 809 are connected to Internet/LAN/WAN 808 via communication lines 819 and 821, respectively. Although CAT5 cabling is the preferred cabling for communication lines 819 and 821, other cabling may be used, such as coaxial, fiber optic or multiple CAT5 cables. Alternatively, wireless networking equipment may also be utilized to connect RMU 809 to Internet/LAN/WAN 808 and serial devices 811a-n, servers 813a-n, computers 815a-n, and power supply 817. Similarly, wireless networking equipment may also be utilized to connect user workstation 801 to Internet/LAN/WAN 808.

Alternatively, user workstation 801 may utilize PSTN 806 to connect to RMU 809. If PSTN 806 is utilized to connect to RMU 809, communication lines 820 and 822 would preferably be CAT 3 cables. As an example, this means of communication may be utilized in emergency situations, such as if Internet/LAN/WAN 808 is not functioning properly.

Communication lines 819 and 821 are connected to user workstation 801 and RMU 809 by plugging each end into a RJ-45 socket located on the respective pieces of equipment to be coupled by the CAT5 cable. Although RJ-45 sockets and plugs are preferred, other types of connector may be used, including but not limited to: RJ-11, RG-58, RG-59, British Naval Connector ("BNC"), and ST connectors.

The remote management system includes local user workstation 801, preferably comprising dedicated peripheral devices such as keyboard 803, video monitor 805 and cursor control device 807. User workstation 801 is also in communication with or embeds RFID transceiver 121. Other peripheral devices may be located at workstation 801, such as a printer, scanner, video camera, biometric scanning device, microphone, etc. Each peripheral device is connected directly or indirectly to user workstation 801, which is attached to Internet/LAN/WAN 808 via communication line 819. In addition, wireless peripheral devices may also be used with this system.

In accordance with the present invention, each user workstation 801 is preferably in communication with an RFID transceiver 121. Further, each user workstation 801 is preferably locked (i.e., cannot be operated) without the presence of a valid RFID tag. Specifically, RFID transceiver 121 senses the presence of an RFID tag 205 (preferably worn by a valid user 207) and communicates the RFID tag identification number to user workstation 801. The system verifies that the identification number is valid and, if verified, user workstation 801 is unlocked for operation. In system 800, RMU 809 communicates through network 213, via connections 221 and 223 to RAS 211. As discussed with respect to FIG. 1 and FIG. 2, RAS 211 may verify as authorized to access some portion or all of system 800 via user workstation 801.

Figure 9:
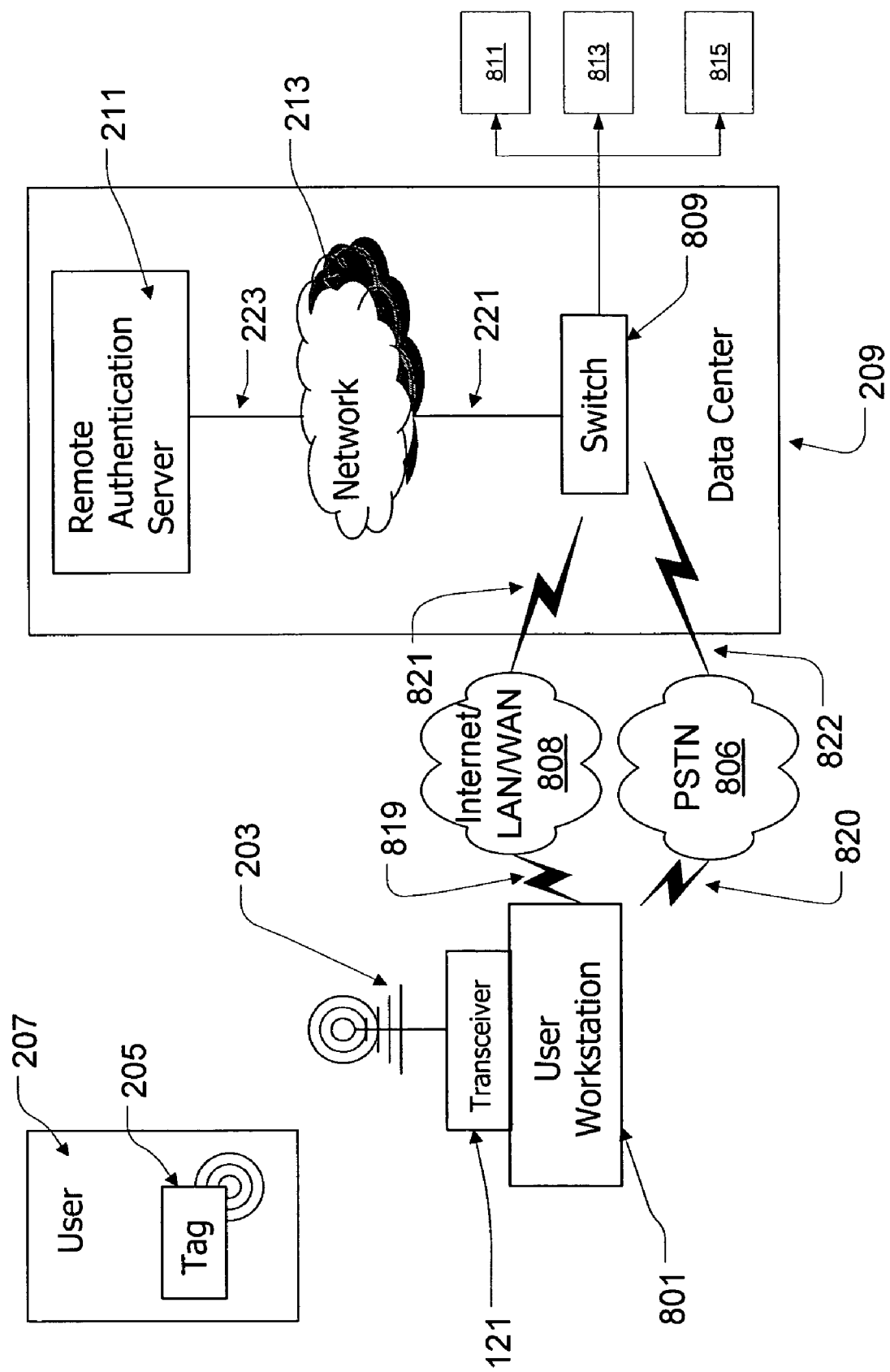
FIG. 9 depicts a schematic representation of the RFID system according to the present invention for use with the remote device management system shown in FIG. 8, illustrating the communication between the RFID transceiver and RFID tag, and the connection of a remote access center to a user workstation.

Turning to FIG. 9, depicted is a schematic diagram illustrating the utilization of the RFID security technology of the present invention in conjunction with a remote device management system such as the one depicted in FIG. 8. As shown, user workstation 801 is in communication with RFID transceiver 121. RFID transceiver 121 also comprises antenna 203 which is used in transmission of radio signals to activate RFID tags 205 worn or held by users 207.

In response to an activation signal from RFID transceiver 121, RFID tag 205 transmits radio waves that include identification information. As is known in the art RFID technology advantageously enables each RFID tag 205 to have a "globally unique" identification number. Thus, it is preferred that RFID tag 205 transmits this globally unique identification number in response to an activation signal from RFID transceiver 121. Also, as is known in the art, RFID tag 205 may be an active or a passive tag. In the preferred embodiment, RFID tag 205 is passive, requiring no additional power source. This is preferred because it allows a small, lightweight, inexpensive implementation of RFID tag 205, which is activated only upon receipt of radio waves from antenna 203.

RFID transceiver 121 is coupled to or embedded within user workstation 801. One RFID transceiver 121 can be used for every user workstation 801. Alternatively, multiple user workstations 801 can share one RFID transceiver 121. The system of the present invention can be implemented with a variety of configurations in which one or more user workstations 801 communicate with an RFID transceiver 121.

Verification of the presence of an authorized RFID tag 205 may be completed by user workstation 801. That is, RFID transceiver 121 receives the global identification number from RFID tag 205. This identification number is then communicated from RFID transceiver 121 to user workstation 801. User workstation 801, utilizing a database of acceptable identification numbers (or equivalents), verifies whether the received identification number is authorized for access to the system. The system alternatively may limit user 207 to only certain portions or features of the system. Once verification is complete, user workstation 801 enables user access. Without the presence of a valid RFID tag 205, user workstation 801 is inaccessible (i.e., it can not be used to view, monitor or select remote devices). Other security measures may be used in conjunction with the RFID technology including identification numbers, passwords, biometric identification information, etc.

Alternatively, verification of an authorized RFID tag 205 may be completed by one or more remote authentication servers ("RAS") 211 or by RMU 809 located at data center 209. As depicted in FIGS. 8 and 9, user workstation 801 communicates with RMU 809 via shared network 808 (e.g., as depicted in FIG. 9, user workstation 801 and RMU 809 connect to network 808 through connections 819 and 821 respectively). RMU 809 can also support dial-in connections through a modem (i.e., PSTN 806). In turn, RMU 809 may communicate with RAS 211 via any communication means. As depicted in FIG. 9, this communication means is network 213. When either RMU 809 or RAS 211 is utilized for verifying a user, identification information from RFID tag 205 is received by RFID transceiver 121 and communicated (optionally through user workstation 801) to RMU 809 and/or RAS 211. RMU 809 and/or RAS 211 verify that the identification information represents a valid user and sends verification information back to user workstation 801. Such a system of remote verification may be preferred because the verification is performed at a site that may be remote from user workstation 801. This prevents an unauthorized user from being able to access the hardware that performs the verification process.

Referring back to FIG. 8, once the system verifies the presence of an authorized user, in a preferred mode of operation, all electronic signals (i.e., keyboard signals and cursor control device signals) received at user workstation 801 from attached peripheral devices are transmitted to Internet/LAN/

WAN 808 via communication line 819. Thereafter, the signals are transmitted to RMU 809 via communication line 821. RMU transmits the received signals to the respective remote equipment, which, in this figure, includes serial devices 811a-n, servers 813a-n, computers 815a-n, and power supply 817.

RMU 809 may be compatible with all commonly used, present day computer operating systems and protocols, including, but not limited to, those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including USB, ASCII, and RS-232.

Serial devices 813a-n are connected to RMU 809 via communication lines 812a-n, respectively. Preferably, communication lines 812a-n are CAT5 cables terminated with RJ-45 connectors. However, a special adapter may be required to properly connect communication lines 812a-n to serial devices 811a-n since not all serial devices are outfitted with RJ-45 ports. For example, if serial device 811a only contained a serial port, the adapter would interface the RJ-45 connector of communication line 812a to the serial port located on serial device 811a.

Similarly, power supply 817 is connected to RMU 809 via communication line 818. Preferably, communication line 117 is a CAT5 cable terminated with an RJ-45 connector on each end.

Servers 813a-n and computers 815a-n are connected to RMU 809 via communication lines 814a-n, and 816a-n, respectively. Preferably, communication lines 814a-n, and 816a-n are three-to-one coaxial cables which allow the keyboard, video, and cursor control device ports of servers 813a-n and computers 815a-n to be connected to a single port on RMU 809 as shown.

Figure 10:
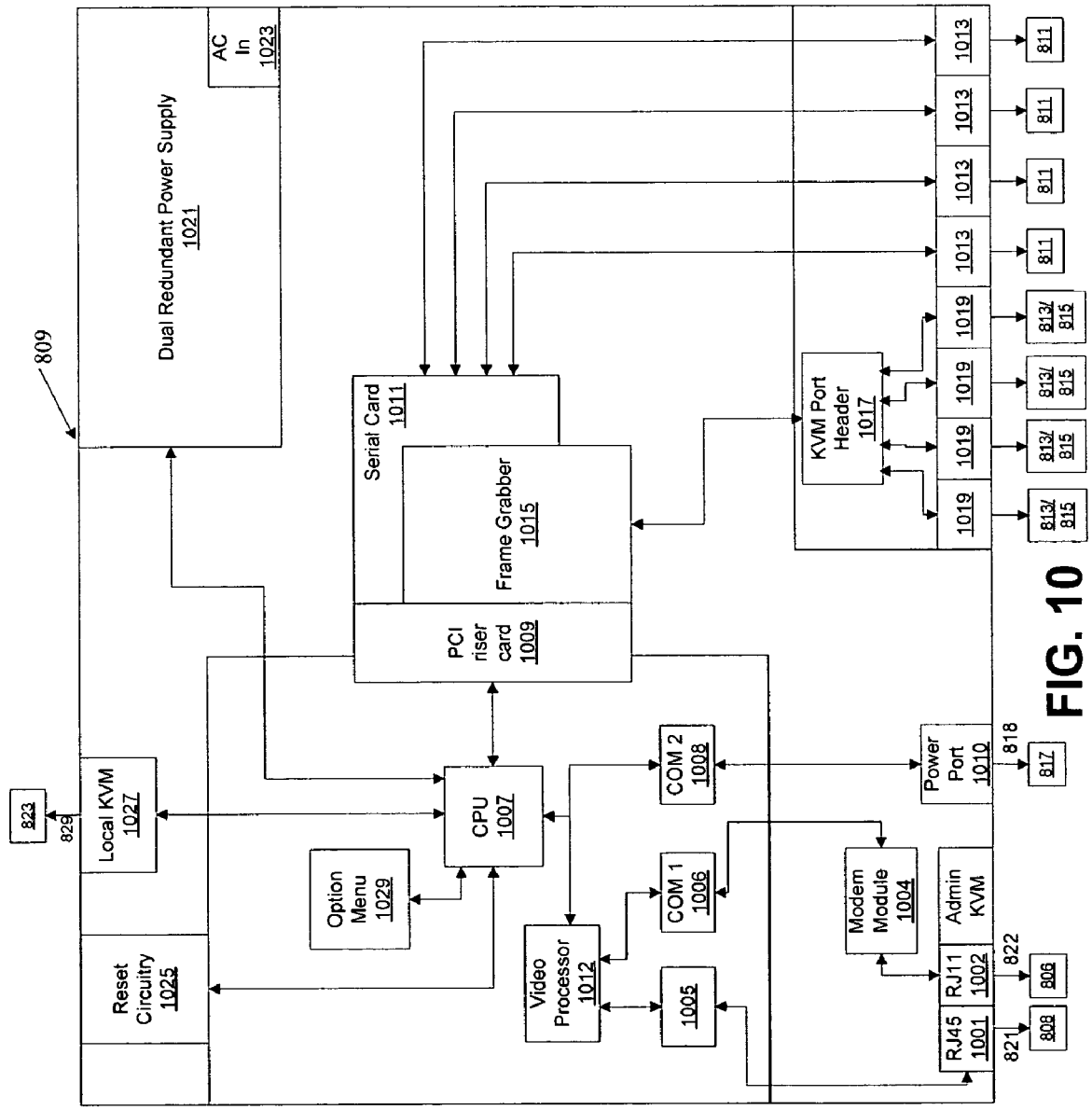
FIG. 10 depicts a block diagram of the RMU shown in FIG. 8, illustrating the internal structure of the RMU and connectors for serial devices, keyboards, video monitors, cursor control devices, and a power supply.

Referring next to FIG. 10, depicted is the preferred embodiment of RMU 809 according to the present invention. Keyboard and mouse signals arrive at RJ-45 port 1001 from Internet/LAN/WAN 808 via communication line 821. RMU 809 consists of RJ-45 port 1001, RJ-11 port 1002, Ethernet connector 1005, modem module 1004, communications port connector 1006, CPU 1007, communications port connector 1008, PCI riser card 1009, serial card 1011, video processor 1012, serial ports 1013, frame grabber 1015, KVM port header 1017, KVM ports 1019, power supply 1021, power port 1023, reset circuitry 1025, local KVM port 1027, and option menu circuit 1029. As shown, the keyboard and/or cursor control device signals initially arrive at RJ-45 port 1001 of RMU 809 from Internet/LAN/WAN 808 via an Ethernet connection. The signals are then transmitted to Ethernet connector 1005 which depacketizes the signals. Alternatively, the signals may arrive from PSTN 806 at RJ-11 port 1002 if the keyboard and/or cursor control device signals were transmitted via a modem. In this case, the signals are transmitted to modem module 1004, which demodulates the received signals, subsequently sending signals to communications port connector 1006 which depacketizes the signals.

From Ethernet connector 1005 or communications port connector 1006, the keyboard and/or cursor control device signals are then transmitted to CPU 1007 via video processor 1012. CPU 1007 utilizes routing information contained within the keyboard and/or cursor control device signals to determine the proper destination for the keyboard and cursor control device signals. If the keyboard and cursor control device signals specify a command to power supply 817, CPU 1007 interprets the received command (e.g., utilizing a look-up table) and sends the proper command to power supply 817 via communications port connector 1008 and power port 1010. Preferably, power port 1010 is an RJ-45 connector to allow the RMU to interface with a power strip and control it as if it were a serial device.

If CPU 1007 determines that the keyboard and cursor control device signals contain a serial device routing instruction, the keyboard and cursor control device signals are transmitted to serial card 1011 through PCI riser card 1009.

While the present invention has been described with reference to the preferred embodiments and several alternative embodiments, which embodiments have been set forth in considerable detail for the purposes of making a complete disclosure of the invention, such embodiments are merely exemplary and are not intended to limit or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A system for providing secure access to a server management system comprising:

a workstation including a video monitor, a keyboard, and a cursor control device for receiving keyboard or cursor control device commands from an authorized workstation user;

a switch for coupling said workstation to one or more remote servers, the workstation taking control of at least one of the remote servers when logged on the system via the received keyboard or cursor control commands; and a RFID detection circuit coupled to said workstation for detecting RFID signals from a card associated with the authorized workstation user, the RFID signals being indicative of that authorized user's accessibility to one or more of said remote servers, and the system automatically logging a workstation into one of the remote servers when the authorized user's card RFID signals are in the vicinity of the detection circuit and are detected by the detection circuit and the authorized workstation user enters keyboard or cursor control device command indicative of the authorized workstation user's access and, wherein the system automatically logs a workstation off the remote server-when the authorized workstation user's card RFID signals are no longer in the vicinity of the detection circuit despite the presence of keyboard or cursor control device commands wherein keyboard, mouse and video signals are transmitted to said workstation from at least one of said remote devices when said user has access to said workstation;

wherein the authorized user's accessibility is periodically confirmed by detecting signals indicative of the authorized user's presence after an initial login;

wherein said RFID signal includes a unique identification number.

2. A system according to claim 1, wherein the RFID detection circuit communicates with a signal generating means capable of generating a signal within a pre-defined vicinity.

3. A system according to claim 2, wherein said vicinity is a pre-defined distance from the detection circuit to the signal generating means.

4. A system according to claim 2, wherein said RFID detection circuit receives said RFID signals from said signal generating means and decodes said signal for user verification.

5. A system according to claim 4, wherein said workstation is inaccessible unless said user verification is confirmed.

6. A system according to claim 1, wherein said switch may be locally or remotely located to said workstation and said remote devices.

7. A system according to claim 1, wherein the at least one remote servers is separated from the workstation by a network selected from the group consisting of the Internet, a local area network ("LAN"), a wide area network ("WAN"), a wireless network, and a modem connection.

8. A system according to claim 1, wherein the system logs out when an authorized user accessibility is not confirmed by detecting signals indicative of the authorized user's presence after an initial login.

9. A system according to claim 1 wherein the system converts the keyboard or cursor control device commands and then emulates such signals and couples them to respective ports on the at least one remote server.

10. A switching system according to claim 1 wherein the workstation communicates using a protocol selected from the group consisting of Universal Serial Bus ("USB"), American Standard Code for Information Interchange ("ASCII") and Recommended Standard-232 ("RS-232").

11. A secure, remote device management system comprising:
   a remote management unit for coupling one or more user interface devices to one or more remote devices; and
   a radio frequency identification (RFID) transceiver coupled to said one or more user interface devices for detecting RFID signals, said signals indicative of an authorized user's accessibility to said system,
   wherein the one or more user interface devices takes control of the one of more remote devices when logged on the system, the user interface device being logged on the system when RFID signals are detected and the user enters information via the user interface device indicative of the user's access, and the authorized user interface device being logged off the system when the authorized user's RFID signals are no longer detected within a pre-defined range of the RFID transceiver despite the presence of a user input signal to the user interface device
   wherein keyboard, mouse and video signals are transmitted to at least one said user interface device from at least one of said remote devices when said user has access to said at least one said user interface device;
   wherein the authorized user's accessibility is periodically confirmed by detecting signals indicative of the authorized user's presence after an initial login;
   wherein said RFID transceiver communicates with an RFID transponder within the pre-defined range; and
   wherein said transponder transmits radio frequency signals containing a unique identification number.

12. A system according to claim 11, wherein said transponder transmits said radio frequency signals to an antenna.

13. A system according to claim 12, wherein said antenna communicates with said transceiver.

14. A system according to claim 11, wherein said transceiver receives said radio frequency signals from said transponder and decodes said unique identification number for user verification.

15. A system according to claim 14, wherein said one or more user interface devices is inaccessible unless said user verification from said transponder occurs by said transceiver.

16. A system according to claim 11, wherein said remote management unit may be locally or remotely located to said one or more user interface devices and to said remote device.

17. A system according to claim 11, wherein the system logs out when the authorized user accessibility is not confirmed by detecting signals indicative of the authorized user's presence after an initial login.

18. A switching system comprising:
   a workstation including a keyboard, a video monitor and a cursor control device;
   a switch for coupling said workstation to one or more remote devices;
   a radio frequency identification (RFID) transponder; and
   a radio frequency identification (RFID) transceiver, wherein said transceiver communicates with said workstation to verify an authorized user,
   further wherein the workstation is logged on the system and takes control of the one or more remote devices when the authorized user is verified and the workstation is logged off the system and denied access to the one or more remote devices when the transceiver does not detect the authorized user's RFID signals within a pre-defined range of the transponder despite workstation user input signals to the keyboard or cursor control device;
   wherein keyboard, mouse and video signals are transmitted to said workstation from at least one of said remote devices when said user has access to said workstation; and
   wherein the authorized user's accessibility is periodically confirmed by detecting signals from said transponder in response to activation signals from said transceiver after an initial login;
   wherein said transceiver sends activation signals;
   wherein said transponder receives said activation signals from said transceiver when said transponder and said transceiver are within the pre-defined range;
   wherein said transponder transmits radio frequency signals to said transceiver within the same frequency range as said activation signals from said transceiver;
   wherein said transceiver receives said radio frequency signals from said transponder; and
   wherein said radio frequency signals contain a unique identification number.

19. A system according to claim 18 wherein said user workstation is inaccessible unless said radio frequency signals containing said unique identification number are verified by said transceiver.

20. A system according to claim 18, wherein said transceiver demodulates said radio frequency signals from said transponder to extract said unique identification number.

21. A system according to claim 18, wherein said transponder communicates with said transceiver in said pre-defined range.

22. A system according to claim 18, wherein said pre-defined range is some distance from said transponder to said transceiver.

23. A system according to claim 18, wherein said user workstation is inaccessible if said transponder and said transceiver are outside said pre-defined range.

24. A system according to claim 18, wherein the system logs out when the authorized user's accessibility is not confirmed by detecting signals from said transponder in response to activation signals from said transceiver after an initial login.

25. A system according to claim 18 wherein the one or more remote devices are servers, computers or networking equipment.

26. A system according to claim 18 wherein the one or more remote devices are separated from the workstation by a network selected from the group consisting of the Internet, a local area network ("LAN"), a wide area network ("WAN"), a wireless network, and a modem connection.

27. A system according to claim 18 wherein the system converts the keyboard or cursor control device commands and then emulates such signals and couples them to respective ports on the at least one remote server.

* * * * *